United States Patent [19]

Severing

[11] 4,314,194
[45] Feb. 2, 1982

[54] ALTERNATOR-RECTIFIER UNIT WITH HIGHER VOLTAGE EXCITATION CIRCUIT

[75] Inventor: Joachim Severing, Ludwigsburg, Fed. Rep. of Germany

[73] Assignee: Robert Bosch GmbH, Stuttgart, Fed. Rep. of Germany

[21] Appl. No.: 147,177

[22] Filed: May 6, 1980

[30] Foreign Application Priority Data

May 18, 1979 [DE] Fed. Rep. of Germany ....... 2920101

[51] Int. Cl.³ .......................... H02J 7/14; H02P 9/30
[52] U.S. Cl. ........................................ 322/89; 322/90; 322/93; 320/64
[58] Field of Search .................. 322/28, 89, 90, 93, 322/95, 96; 320/64, 68

[56] References Cited

U.S. PATENT DOCUMENTS

| | | | |
|---|---|---|---|
| 3,361,953 | 1/1968 | Neval | 322/89 X |
| 4,117,390 | 9/1978 | Iwata et al. | 322/90 |
| 4,121,148 | 10/1978 | Platzer | 322/90 X |
| 4,153,869 | 5/1979 | Ragaly | 322/93 X |

*Primary Examiner*—Robert J. Hickey

*Attorney, Agent, or Firm*—Frishauf, Holtz, Goodman & Woodward

[57] ABSTRACT

Auxiliary windings wound in close juxtaposition to the respective phase windings of a three-phase alternator are connected in series with the star-connected phase windings at one end and at the other end to the diodes of a separate rectifier bridge for the current supplied to the exciter winding of the alternator. This makes possible operation of the exciter winding at higher voltage and lower current than in the case where the excitation voltage is generated only by the main phase windings of the alternator. Since the excitation windings carry only the exciter current, they may be made of finer wire than the main phase windings, but they should be wound close to the main phase windings so as to be cut in the same way by the lines of force of the rotating field. The current supply for the voltage regulator which controls the excitation current is obtained either from the output of the main rectifier bridge that is connected to the storage battery or from still another rectifier fed by the main phase windings of the alternator only. Pre-excitation current is provided from the battery through a monitor lamp and a diode.

2 Claims, 1 Drawing Figure

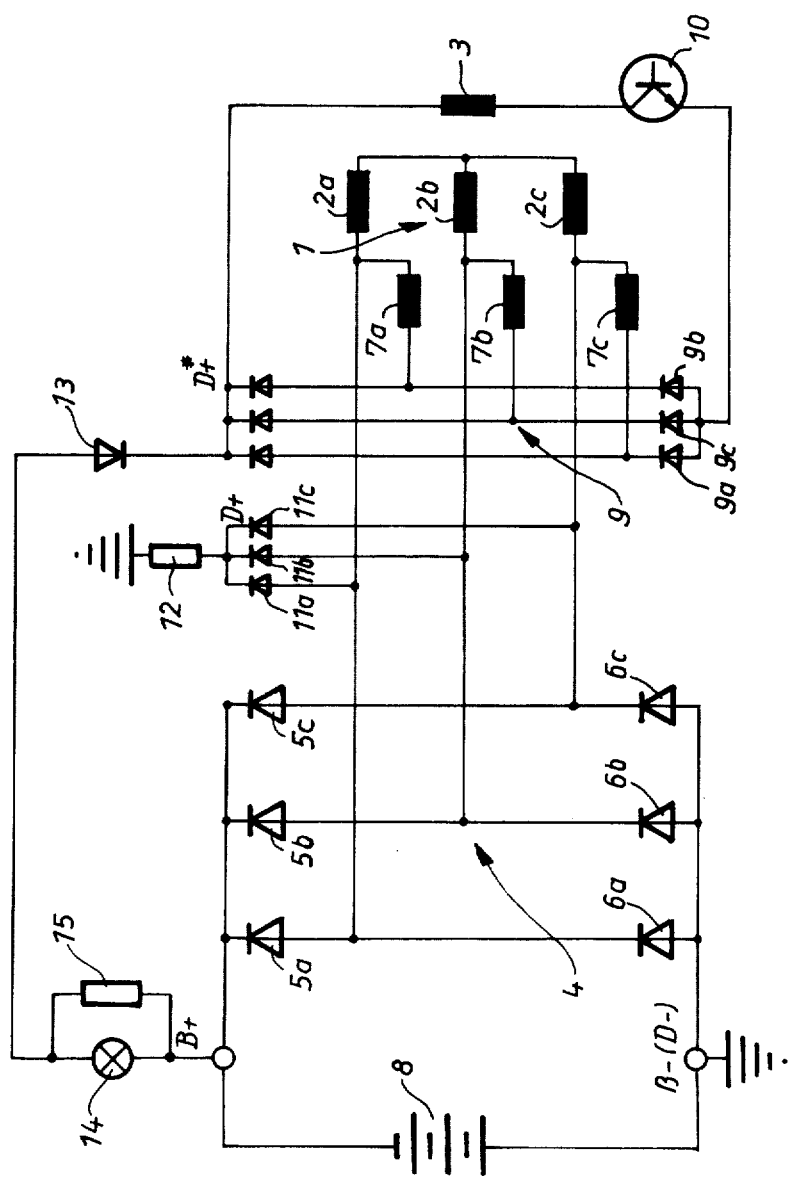

ALTERNATOR-RECTIFIER UNIT WITH HIGHER VOLTAGE EXCITATION CIRCUIT

This invention relates to alternator-rectifier units, and more particularly to the kinds of engine-driven alternators used on motor vehicles and other mobile or isolated units and having several phase windings on a multipole core and an excitation winding on another core, the excitation winding being energized by a set of rectifier diodes distinct from the main set of diodes used for the output of the unit. The excitation of the exciter winding is usually controlled by a voltage regulator with reference to the output voltage of the main set of rectifier diodes.

Alternator-rectifier units of the general type to which the present invention pertains are widely used, particularly for automobiles. In such service, a storage battery is connected across the load to provide starting power for the engine.

It is known in such alternators to lead the exciter current through a single toroidal coil, which may be stationary or rotary, wound on a core having various poles. The exciter current is branched off from the main current produced by the device, most often, as already mentioned, through a separate set of diodes that have their output terminals connected together and connected to the input connection of a regulator which control the excitation current of the excitation winding in the rotor of the alternator according to the load condition of the device. The exciter winding is more commonly provided on a rotary core. The alternator conventionally has a three-phase stator winding connected to the various rectifier diodes.

In order that a magnetic force field cutting the stator windings will be produced by the rotary exciter winding, the rotor core that carries a set of poles is enveloped on both sides respectively by halves of a claw-pole core, the poles of these two halves alternately interfitting, for which reason such a stator core is referred to as an interdigital core.

Since in mobile service such alternator-rectifier units have a low voltage output and operate in a self-excited mode, with the excitation voltage being the same as the output voltage of the alternator-rectifier, it is necessary to choose between the respective disadvantages of utilizing values of exciter current that are relatively large for the exciter winding, on the one hand, or to increase the space requirements of the toroidal exciter winding at the expense of the amount of iron available for the magnetic path, on the other hand, in order to obtain sufficiently high flux from the exciter coil. There is the further disadvantage that when the exciter winding is fed through sliprings on the rotor shaft, there is a further loss in the brushes used with the sliprings and, moreover, always a voltage drop at the regulating transistor of the voltage regulator. In most modern systems, the voltage regulator is a transistorized device exerting its control through an output transistor.

Finally, the use of relatively large exciter currents used for obtaining a high degree of flux additionally load the stator windings, reducing the output power rating of the device.

SUMMARY OF THE INVENTION

It is an object of the invention to provide an alternator-rectifier unit in which the greatest possible excitation flux can be provided for a self-excited alternator without subjecting the device to the disadvantages of the usual flux-increasing measures, either providing relatively heavy current through a normal winding or greatly increasing the size of the winding.

Briefly, the exciter current is delivered at a voltage considerably higher than the output voltage of the generator, by providing at least partly bifilar windings, in the place of single wire phase windings, one wire of the bifilar winding being the usual phase winding for connection to the main set of rectifying diodes and the other constituting an auxiliary winding connected in series with the associated phase winding and having its free end connected to at least one of a set of rectifying diodes arranged to energize the exciter winding. The latter is, as usual, connected for current control by a voltage regulator that operates with reference to the output of the main set of rectifying diodes. The phase windings and their associated windings are wound on the usual multiphase winding core, usually the stator core of the alternator, while the exciter winding is usually wound on the rotor core and is supplied with current through brushes and sliprings. The excitation winding is sometimes referred to as the field winding in such a structure.

Each auxiliary winding could be said to be wound physically in parallel with the main phase winding with which it is associated, while being connected electrically in series thereto, but strictly speaking, physical parallelism applies only to straight lines and it is more appropriate to state that the windings are "alongside" each other or that the auxiliary and main phase windings are wound in bifilar fashion.

The alternator-rectifier in accordance with the invention has the advantage that the exciter winding is operated at a higher excitation voltage in spite of the fact that the generator delivers a relatively low and constant voltage at its output terminals. In consequence, it is possible to operate an alternator of given physical dimensions at much higher power output without encountering serious disadvantages because of the greater flux density made possible by the present invention, or else, for a given flux density to reduce the excitation current by utilization of the present invention or, alternatively, to reduce the space utilized by the exciter winding and thereby enable a more efficient rotor core to be used. The first of these last two alternatives increases the efficiency and the second increases the power output of the alternator because of the increased amount of iron in the magnetic path.

Preferably, the excitation current is rectified by diodes in a full bridge circuit, but it is possible to use a smaller number of diodes in a so-called star circuit. Also, rather than supply power to the transistors of the voltage regulator from the terminals of the main rectifier circuit, still another set of diodes may be used with the main phase windings to supply energizing voltage to the voltage rectifier since a low voltage is desired for that purpose. In this last-mentioned case, provision of load resistor in the rectifier circuit for the transistor power supply may also be useful.

A particularly useful extension of the invention provides for connection of the battery-charging monitor lamp in a circuit between the ungrounded terminal of the main rectifier and an isolating diode 13 connected to the corresponding terminal of the excitation rectifier. The isolating diode prevents the higher excitation voltage from passing to the lamp and to the main rectifier circuit, but allows a storage battery at the output of the main rectifier to provide initial excitation to the exciter winding of the alternator during start-up, while at the same time turning on the monitor lamp to show that the alternator is not yet charging the battery.

BRIEF DESCRIPTION OF THE DRAWING

The invention is further described by way of specific example with reference to the annexed drawing, of which the single FIGURE is a circuit diagram of an alternator-rectifier unit according to the invention, the diagram being simplified in certain respects, for example omission of the circuit of the voltage regulator, and being complete mainly as to the manner in which the excitation current is produced.

DESCRIPTION OF THE ILLUSTRATIVE EMBODIMENTS

The basic concept of the present invention is to transform the multiphase output voltages of the alternator which provide the output terminal voltage, for example by raising the voltage at each phase of a three-phase alternator output, providing the transformation merely for an excitation winding. As already explained, this is done providing bifilar phase windings, with the additional wire of each such winding being connected in series with the normal single wire phase winding. In this manner, it is assured that the auxiliary winding so provided are cut by the same flux that cuts the main windings alongside of which they are wound. The auxiliary windings carry only the exciter current and are connected through separately provided excitation diodes to the excitation winding.

The circuit illustrating this and further refinements of the invention is illustrated in the drawing.

The normal stator winding of a three-phase alternator is indicated at 1 and comprises three phase windings 2a, 2b and 2c connected together in the so-called star connection. These phase windings may be referred to as the main phase windings for reasons that will presently appear. The exciter winding is shown at 3. The construction of the cores on which these windings are wound, the rotary mounting of the core of the exciter winding, the feeding of the excitation winding through brushes and sliprings, and so on, are all conventional and their particular form has nothing to do with the present invention. In consequence, these details are omitted in order to simplify the drawing illustrating the invention. It is to be understood, however, that in normal production the three-phase winding that feeds the rectifier diodes is a fixed structure on a stator core, whereas a rotor mounted on a shaft and rotating inside the stator carries the exciter winding 3, which is fed with excitation current, through sliprings on the shaft. As mentioned before, the stator core is of the interdigital type providing alternating poles from each half of the core which are located just beyond the periphery of the rotor core which also has a multiplicity of poles for the flux set up in the rotor core by a toroidal exciter winding.

The phase windings 2a, 2b and 2c are connected to the main rectifier bridge 4 consisting of 6 power diodes, of which the diodes 5a, 5b and 5c are the so-called positive diodes and the diodes 6a, 6b and 6c are the three negative diodes, so-called because one triplet is connected to the positive terminal B+ and the other to the negative terminal of the on-board electrical system of a vehicle, the negative terminal being designated on the drawing of B−(D−), which designation indicates that it is the negative terminal both of the electrical system generally and of the excitation circuit of the alternator. The storage battery 8 is shown connected across the output terminals just mentioned, but the remainder of the electrical system which is connected to these output terminals is not shown in the drawing.

In accordance with the present invention, auxiliary windings 7a, 7b and 7c are respectively connected in series with the main phase windings 2a, 2b and 2c for generating the excitation current for the excitation winding 3. Each of these series connections of two windings is made up of bifilar-wound pair of windings in series. The bifilar form of winding is preferred because it is the simplest way of assuring that each auxiliary winding and its associated winding are simultaneously cut by the same displacement by the lines of force of the magnetic field, but any other juxtaposition of each auxiliary winding close to a main winding would be usable. As the result of the series connection of each auxiliary winding with the main phase winding, at each free end of the auxiliary winding, an excitation voltage which is higher than the output terminal voltage of the generator unit (which remains the same) is available and the portion by which the excitation voltage is higher than the main output voltage can be set at any desired value according to the requirements of the particular design in the light of the principles of the present invention. In other words, it is not necessary that the auxiliary windings have the same length and number of turns as the main phase windings and in case still higher excitation voltage is desired for a particular case, the auxiliary windings may have additional turns. Since the auxiliary windings 7a, 7b and 7c, in their preferred form are wound in bifilar fashion with reference to the main windings, but carry only the smaller excitation current, they can be wound with wire of smaller diameter in accordance with well-known electrical laws. The series connection, of course, must be done in such a way that the connected windings are series-aiding.

The higher voltages used by the series connected pairs of phase windings are then rectified by the excitation current rectifier bridge 9 which is separate from the main rectifier bridge 4 previously described. After rectification, the exciter current is supplied to the field or exciter winding 3 in series with the control terminals of a transistorized voltage regulator, of which only the output transistor 19 is shown in the drawing. In the illustrated case the emitter-collector path of the transistor 10 is in series with the exciter winding 3.

Since a voltage higher than a conventional excitation voltage is delivered by the rectifier bridge 9, it may be desired to provide an additional source of voltage for the energizing power for the transistors of the voltage regulator, although it would also be feasible to supply those transistors with energizing power from the terminals B+. The drawing shows an additional set of three diodes 11a, 11b, and 11c providing a separate output voltage D+ for such an auxiliary power supply, which are connected to a resistor 12 having its other terminal grounded so as to provide for a constant forward current through the auxiliary rectifiers 11a, 11b and 11c and also to reduce any possible voltage differences between the terminals B+ and D+. The circuits supplied with voltage from the terminal B+ are not shown in the drawing. The positive terminal of the excitation diode bridge is designated D+* in the drawing. The diodes 11a, 11b and 11c are connected to the terminals of the phase windings 2a 2b and 2c to which the diodes of the main rectifier bridge 4 are also connected.

For a given excitation voltage and given rotor dimensions, the highest possible flux is given by the following well-known formula:

$$\theta = \sqrt{\frac{U_E{}^2 \cdot A_{Sp} \cdot f_w \cdot \kappa}{R_{20} \cdot (1 + \alpha \Delta \nu)^2 \cdot l_m}}$$

to which the following definitions apply $A_{SP}$ = Cross Section of winding window
$\theta$ = Flux
$U_E$ = Excitation Voltage
$R_{20}$ = Resistance of the winding at 20° C.
$l_m$ = Average winding length
$f_w$ = Fill factor
$(1+\alpha\Delta\zeta)$ = Change of resistance by temperature increase
$\chi$ = Specific conductivity
$w$ = Number of turns in winding.

With the assumption of constant warming, this formula can be simplified as follows:

$$\theta = c \cdot \frac{U_E}{\sqrt{R_{20}}}$$

It accordingly follows that there is a direct relation between excitation voltage and the flux that can be produced by the excitation winding, which flux determines the induction of corresponding phase voltages of the fixed stator windings. The invention makes it possible to raise the flux as much as may be desired without producing greater electrical loading of the alternator.

Since the excitation voltage present at the connection terminal D+* greater than the usual voltage of the electrical system powered by the alternator-rectifier and the storage battery 8, which voltage appears at the terminal B+ when the other terminal of the main rectifier output is grounded as shown in the drawing, there is provided an isolating diode 13 by means of which the usual pre-excitation circuit through a charging-monitor lamp 14 and/or a resistor 15 can be provided in spite of the higher excitation voltage. When the ignition switch (not shown) of the vehicle is closed a circuit is then provided through the charging monitor lamp 14 and its parallel resistor 15 and then through the isolating diode 13 connecting the positive pole of the battery 8 to the exciter winding 3 for providing pre-excitation current. After the excitation and the power output of the alternator has built up, all further excitation current is delivered by the higher voltage of the exciter diode bridge 9.

It is also possible to provide the excitation current by a rectifier circuit that requires only three diodes. In such a case the diodes 9a, 9b and 9c of the rectifier bridge 9 would be omitted, leaving the remaining diodes in circuit, in what would then be a simple star-connected rectifier, while the emitter of the output transistor 10 of the regulator would then be grounded to the vehicle chassis.

Although the invention has been described with reference to a specific illustrative embodiment, it will be understood that modifications and variations are possible within the inventive concept.

I claim:

1. An alternator-rectifier for a motor vehicle or other mobile or isolated unit that has its electric power requiements supplied by an engine-driven alternator feeding rectifier bridge arranged to convert multiphase alternating current into direct current delivered at a regulated voltage comprising:

an alternator having a multiple core and a plurality of phase windings wound on said multiple core, a second core having an exciter winding thereon, said multipole and second cores being arranged for relative rotary movement, and a set of auxiliary windings on said multipole core wound respectively alongside said phase windings so as to be intersected by the same portion of a field set up by said exciter winding, said auxiliary winding being connected in series with the respective phase windings alongside of which they are wound;

a main rectifier bridge connected to said phase windings and to positive and negative output terminals for supplying rectified current to a load;

a plurality of exciter diodes, at least one connected to each of said auxiliary windings, for supplying rectified current at a voltage greater than the voltage across said load to a circuit comprising said exciter winding and voltage regulator for regulating the voltages across said load by control of the current passing through said exciter winding, and another set of diodes connected to said phase windings, one to each phase winding, and also together, for providing an independently rectified low-voltage supply of current for said voltage regulator.

2. An alternator-rectifier as defined in claim 1, in which there are three phase windings and three auxiliary windings and in which said three phase windings are star-connected with each other and are wound on a stationary multipole core, said exciter winding being wound on a rotary core.

* * * * *